(12) United States Patent
Pal

(10) Patent No.: US 9,871,426 B1
(45) Date of Patent: Jan. 16, 2018

(54) ELECTRICAL MACHINE WITH REDUCED WINDAGE

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/702,109

(22) Filed: Sep. 12, 2017

Related U.S. Application Data

(63) Continuation of application No. 14/568,148, filed on Dec. 12, 2014, now Pat. No. 9,793,782.

(51) Int. Cl.
*H02K 9/19* (2006.01)

(52) U.S. Cl.
CPC ....................................... *H02K 9/19* (2013.01)

(58) Field of Classification Search
CPC .. H02K 1/32; H02K 3/24; H02K 5/20; H02K 9/19; H02K 9/16

USPC ............................. 310/260, 54, 58, 60 A, 61
See application file for complete search history.

(56) References Cited

U.S. PATENT DOCUMENTS

| | | | | |
|---|---|---|---|---|
| 919,511 | A * | 4/1909 | Wood | H02K 1/146 310/194 |
| 3,088,042 | A * | 4/1963 | Robinson | H02K 9/20 310/54 |
| 6,366,001 | B1 * | 4/2002 | Gunnarsson | H02K 3/51 310/194 |
| 7,952,240 | B2 * | 5/2011 | Takenaka | H02K 1/20 310/260 |
| 8,084,902 | B2 * | 12/2011 | Lemmers, Jr. | H02K 1/22 310/270 |
| 2003/0030333 | A1 * | 2/2003 | Johnsen | H02K 1/32 310/54 |

* cited by examiner

*Primary Examiner* — Terrance Kenerly
(74) *Attorney, Agent, or Firm* — Carlson, Gaskey & Olds, P.C.

(57) ABSTRACT

A rotating machine has a shaft rotatable about an axis, a rotor rotatable with the shaft, and a rotor end winding at an axial end of the rotor. A stator is spaced from the rotor and forms a gap therebetween. The stator comprises a stator winding. A fluid system directs fluid through to the stator. A baffle to diverts fluid away from the gap and toward the stator.

9 Claims, 5 Drawing Sheets

ELECTRICAL MACHINE WITH REDUCED WINDAGE

CROSS REFERENCE TO RELATED APPLICATIONS

This application is a continuation of U.S. patent application Ser. No. 14/568,148, which was filed Dec. 12, 2014.

BACKGROUND

This application relates to improvements in cooling rotating electrical machines.

One type of rotating electrical machine is a generator. A generator includes a rotor driven by a power source to rotate relative to a stator. The relative rotation of the rotor adjacent to the stator generates electrical power, thus converting mechanical energy into electrical energy. The electrical power is utilized for various purposes.

Another rotating electrical machine may be a motor. A motor includes a rotor having conductors for carrying current to interact with magnetic fields in a stationary stator. This electromagnetic interaction between the rotor and stator generates forces that turn a shaft, converting electrical energy into mechanical energy for various purposes.

Both generators and motors have air gaps between their respective rotors and stators.

Rotating electrical machines may rotate at high speeds and generate significant heat. The machines may be cooled by cooling liquid. For liquid cooled high speed machines, there is a propensity for cooling fluid to enter the air gap between the rotor and stator. Fluid in the air gap may result in frictional loss causing reduced efficiency and reduced reliability.

SUMMARY

A rotating machine has a shaft rotatable about an axis, a rotor rotatable with the shaft, and a rotor end winding at an axial end of the rotor. A stator is spaced from the rotor and forms a gap therebetween. The stator comprises a stator winding. A fluid system directs fluid to the stator. A baffle diverts fluid away from the gap and toward the stator.

These and other features may be best understood from the following drawings and specification.

BRIEF DESCRIPTION OF THE DRAWINGS

FIG. 5b shows a cross-sectional view of the example baffle in FIG. 5a.

DETAILED DESCRIPTION

Figure 1:
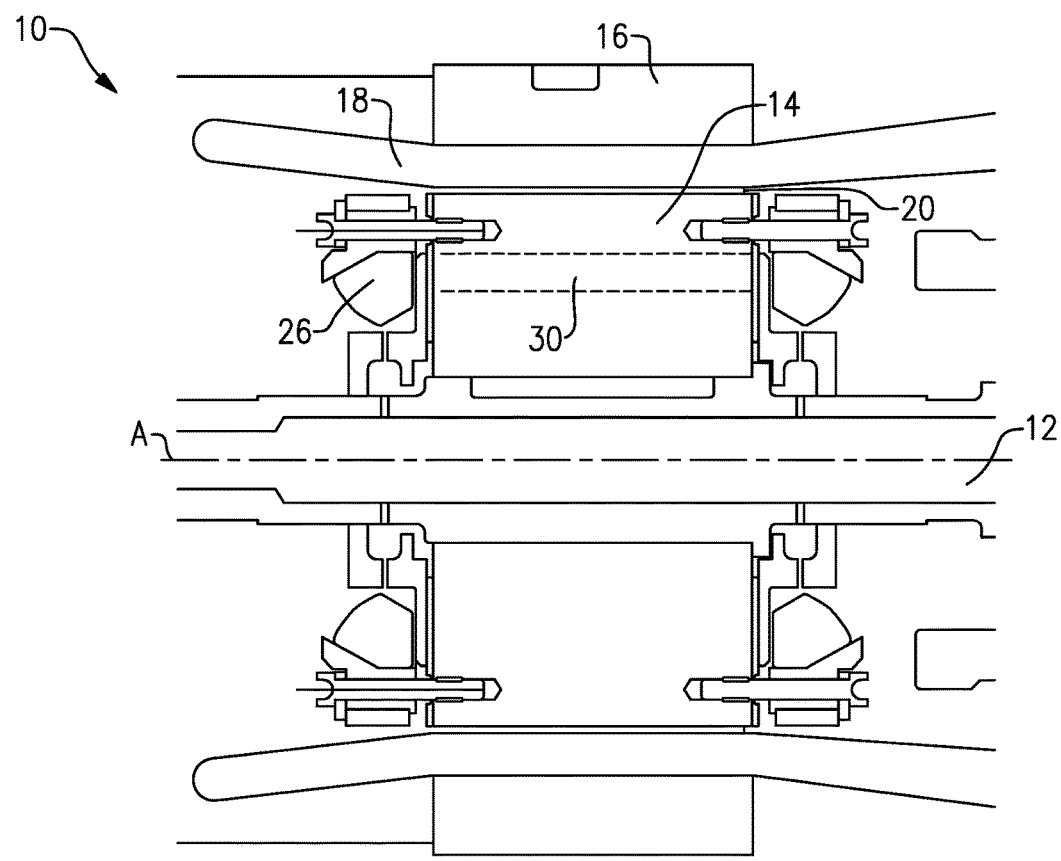
FIG. 1 schematically shows an example rotating machine.

Referring to FIG. 1, an example rotating electrical machine 10 includes a shaft 12 that rotates about an axis "A." A rotor 14 rotates with the shaft 12 relative to a stator 16 radially outward of the rotor 14. The stator 16 may include stator windings 18 on its inner diameter. A gap 20 is provided radially between the rotor 14 and the stator 16 allowing for rotation of the rotor. Through this rotation, the electrical machine 10 converts mechanical energy into electrical energy. Although the example electrical machine 10 is a generator, the electrical machine 10 could be any rotating machine, including a motor.

Figure 2:
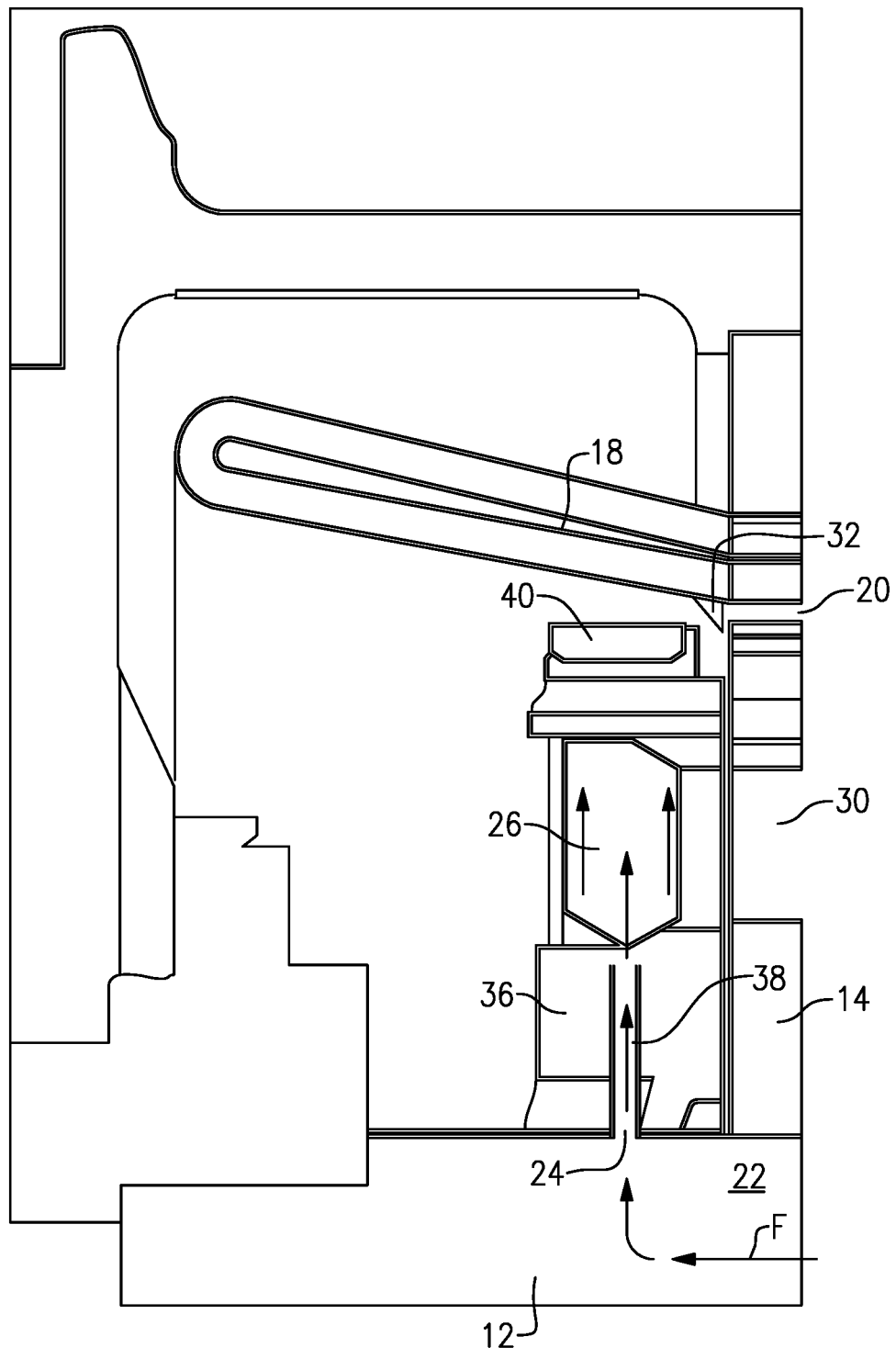
FIG. 2 shows a sectional view of the example rotating machine.

Because the operation generates significant heat, the example rotating electrical machine 10 is liquid cooled. As shown in FIG. 2, cooling fluid flows (flowpath F) through a hollow interior 22 of the shaft 12. The shaft 12 includes an orifice 24. Centrifugal force from rotation causes the fluid to exit the shaft 12 through the orifice 24.

Figure 3:
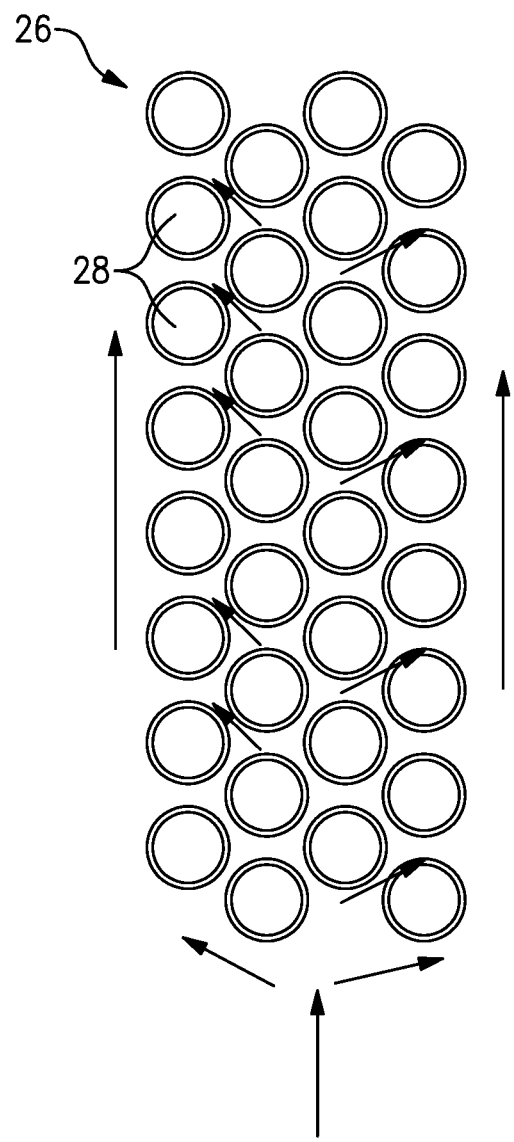
FIG. 3 schematically shows the fluid path through the rotor end winding of the example rotating machine.

That fluid then flows radially outward through and around the rotor end windings 26 (See FIG. 3), including between the plurality of coils 28, to cool the rotor end windings 26. The rotor end windings 26 are provided at an axial end of the rotor windings 30 of rotor 14. Electromagnetic interaction between the rotor windings and the stator windings 18 converts mechanical energy into electrical energy, as is known by one of ordinary skill in the art. In the example, fluid continues to travel radially outward toward the stator windings 18 to provide cooling to the stator windings 18.

Figure 4:
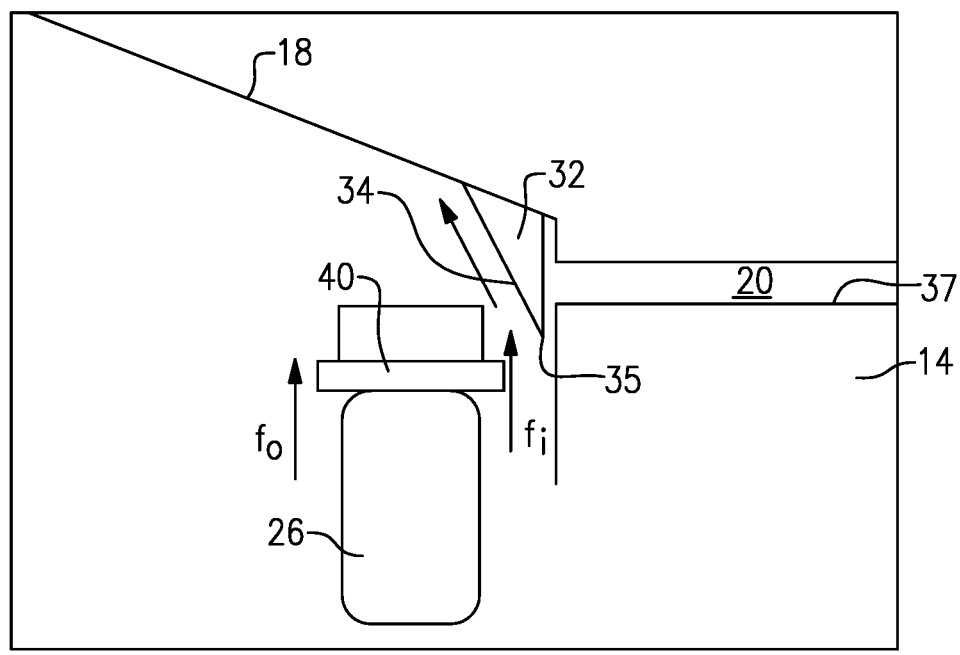
FIG. 4 schematically shows the fluid path with a baffle.

Referring to FIG. 4, the fluid has a propensity to flow into the gap 20 between the rotor 14 and the stator 16. Fluid in the gap 20 would cause frictional (windage) loss due to viscous shearing of the fluid within the gap during rotation, greatly reducing efficiency. A baffle 32 is thus placed adjacent to the gap 20 to divert fluid away from the gap 20.

The example baffle 32 is attached to the inner diameter of the stator winding 18 and is axially outward of the rotor 14 and the gap 20. The baffle 32 includes an edge 34 extending radially outward as it extends axially away from the gap 20 to deflect fluid axially away from the gap 20 and radially toward the stator winding 18. The cross section of the example baffle 32 may be triangular in shape. The baffle 32 is thus positioned such that the edge 34 is provided by the hypotenuse of the triangular cross section, which is angled to deflect fluid axially away from the gap 20 and toward the stator winding 18. The radially inner end 35 of edge 34 is radially inward of the radially outward surface 37 of rotor 14. While a triangular shape is shown, other shapes are contemplated. In one embodiment, the edge 34 may be curved.

Figure 5A:
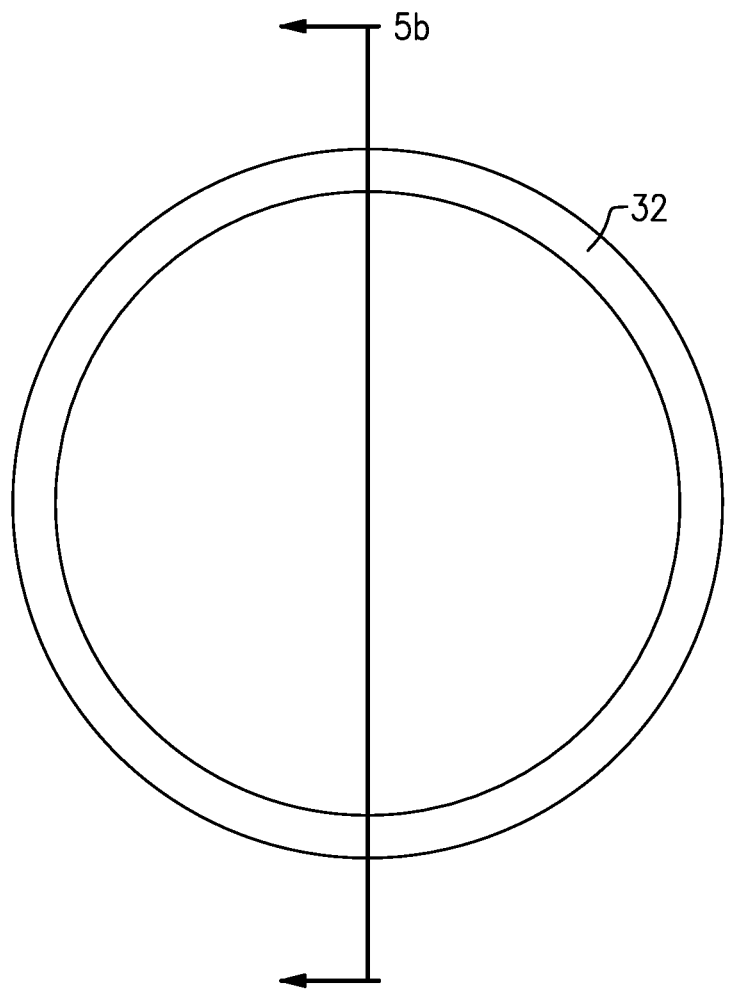
FIG. 5a shows a front view of an example baffle.
Figure 5B:
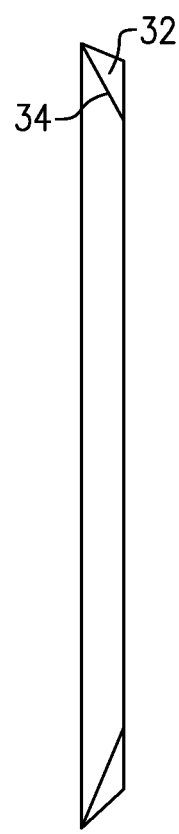

As shown in FIGS. 5a and 5b, the example baffle 32 extends around the entire circumference of the stator winding 18. As one alternative embodiment, the baffle 32 may extend around a partial circumference of the stator winding 18.

In the example, referring back to FIG. 2, fluid exits the orifice 24 and flows radially outward through the end winding support 36 attached to the axial end of the rotor 14. The end winding support 36 provides support for the rotor end windings 26 and is radially between the shaft 12 and the rotor end windings 26. The end winding support 36 includes a channel 38 aligned with the orifice 24 for directing fluid radially outward toward the rotor end windings 26.

After the fluid travels around and through the rotor end windings 26, it continues to flow radially outward toward an end ring 40 configured to hold the rotor end winding assembly together. The fluid then flows radially outward of the end ring 40 toward the stator winding 18, flowing either axially inward (flowpath fi) or axially outward (flowpath fo) of the end ring 40, as shown in FIG. 4. The fluid fi has a propensity for entering the gap 20. Thus, the baffle 32 is placed between fluid path fi and the gap 20 to divert fluid away from the gap and toward the stator winding 18.

Although the example disclosed is an electrical machine having wound rotors and stators, the features described are not limited to those types of machines and may be used in any rotating machines.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A rotating machine, comprising:
   a shaft rotatable about an axis;
   a rotor rotatable with said shaft;
   a rotor end winding at an axial end of said rotor;
   an end winding support attached to said axial end of said rotor, the end winding support positioned radially between the shaft and the rotor end winding to provide support for the rotor end winding;
   a stator spaced from said rotor and forming a gap therebetween, said stator having a stator winding;
   a fluid system configured to direct fluid through the end winding support, through said rotor end winding, and to said stator winding;
   a baffle triangular in cross-section and attached to an inner diameter of said stator winding and positioned to divert fluid away from said gap and to said stator end winding, wherein the longest edge of said triangular cross section of said baffle is an edge that extends axially away from said gap and radially outward to provide a surface to divert said fluid, and a radially inner end of said edge is radially inward of a radially outer surface of said rotor.

2. The rotating machine as recited in claim 1, wherein said radially inner end of said edge is disposed axially between said rotor end winding and said gap.

3. The rotating machine as recited in claim 1, comprising an end ring radially outward of said rotor end winding.

4. The rotating machine as recited in claim 3, wherein said baffle is configured to divert fluid flowing axially inward of said end ring away from said gap.

5. A rotating machine, comprising:
   a shaft rotatable about an axis;
   a rotor rotatable with said shaft;
   a rotor end winding at an axial end of said rotor;
   an end winding support attached to said axial end of said rotor, the end winding support positioned radially between the shaft and the rotor end winding to provide support for the rotor end winding;
   a stator spaced from said rotor and forming a gap therebetween, said stator having a stator winding;
   a fluid system configured to direct fluid through said end winding support, through said rotor end winding, and to said stator winding;
   a baffle attached to an inner diameter of said stator winding and positioned to divert fluid away from said gap and to said stator end winding, wherein said baffle includes an edge that extends axially away from said gap and radially outward to provide a surface to divert said fluid, a radially inner end of said edge is radially inward of a radially outer surface of said rotor, and said radially inner end of said edge is disposed axially between said rotor end winding and said gap.

6. The rotating machine as recited in claim 5, wherein the baffle is triangular in cross-section.

7. The rotating machine as recited in claim 6, wherein said edge is the longest edge of said triangular cross section.

8. The rotating machine as recited in claim 5, comprising an end ring radially outward of said rotor end winding.

9. The rotating machine as recited in claim 8, wherein said baffle is configured to divert fluid flowing axially inward of said end ring away from said gap.

* * * * *